Nov. 5, 1940. M. IRWIN Re. 21,615
IRRIGATING APPARATUS
Original Filed April 1, 1936
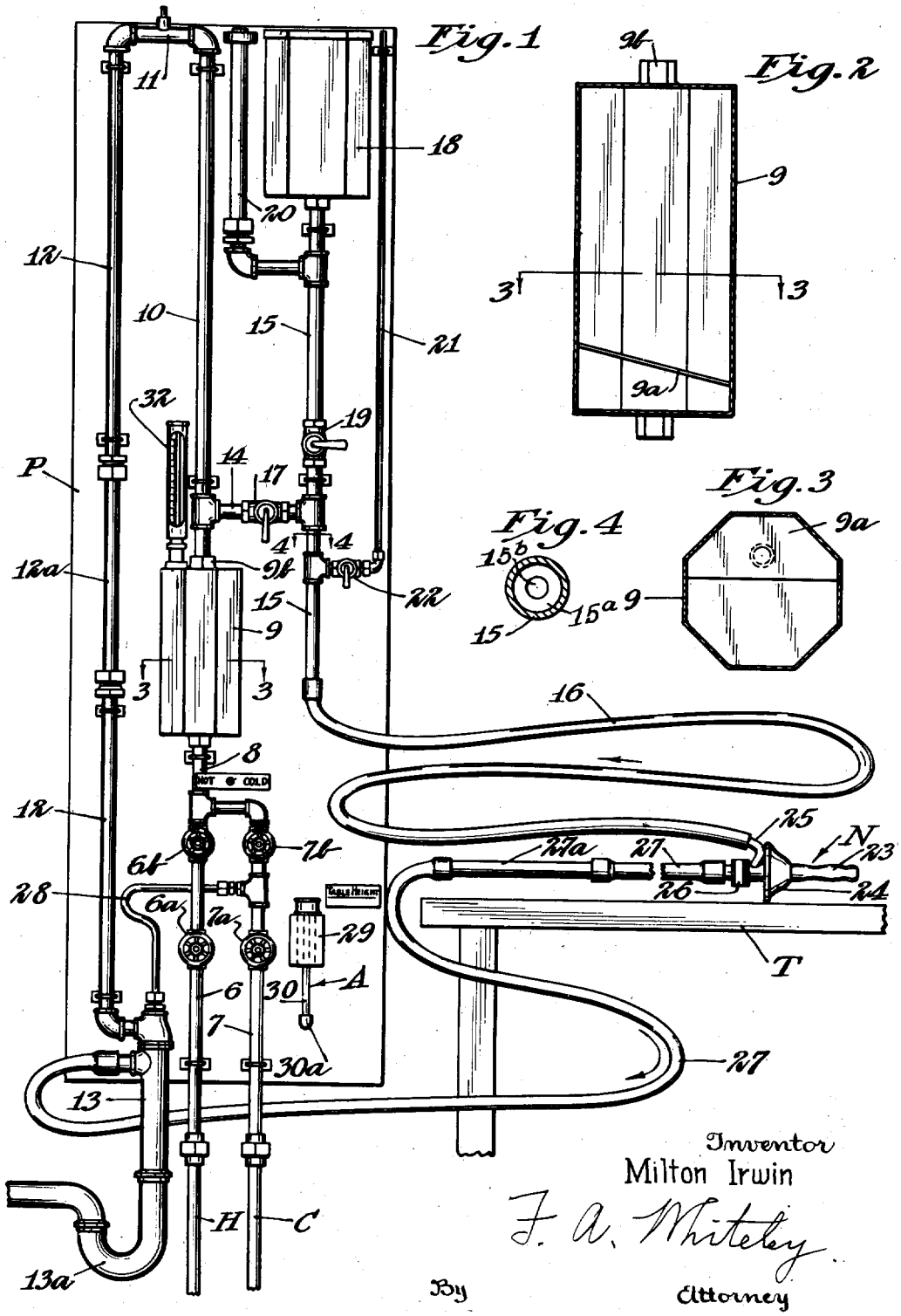
Inventor
Milton Irwin
By F. A. Whiteley
Attorney Reissued Nov. 5, 1940

Re. 21,615

UNITED STATES PATENT OFFICE 21,615

IRRIGATING APPARATUS

Milton Irwin, Minneapolis, Minn., assignor of one-half to Walter G. Berg, Minneapolis, Minn.

Original No. 2,157,756, dated May 9, 1939, Serial No. 72,047, April 1, 1936. Application for reissue April 30, 1940, Serial No. 332,579

7 Claims. (Cl. 128—227)

My invention relates to a colonic and intestinal irrigator and has for its object to provide controllable means for causing a cleansing liquid to be injected into the colon under stabilized pressure and for withdrawal of said liquid together with substances taken from the bowels. The device is, therefore, particularly designed for irrigating and cleansing the intestinal tract.

In the treatment of colitis, constipation and certain types of rheumatism caused by infection of the colon, intestinal tract irrigation and high enemas have been found to produce beneficial results. It is essential in irrigating the colon and intestinal tract that the pressure of the liquid utilized be kept below a predetermined limit, and for the most effective and beneficial cleansing it is essential that means be provided for causing the liquid to enter and leave the intestinal tract under the control of the operator and in suitable volumes and suitable intermittent periods of injection and withdrawal. It is further important that the temperature of the liquid utilized be controlled in order to obtain the most satisfactory results.

It is, therefore, an object of my invention to provide means for delivering a continuous stream of tempered liquid so that said stream will normally discharge to a sewer outlet and to employ in connection with said primary continuous stream a secondary stream of liquid drawn therefrom and adapted to be discharged therewith to the sewer, said secondary stream having connected therein a nozzle or speculum for proper positioning within the rectal opening of a patient, together with means for periodically blocking said secondary stream in its passage to the sewer discharge to cause the same to enter the intestinal tract, and for releasing it to cause it to carry material from the intestinal tract, the speculum when in use being positioned so that the greater part of the vertical extent of the primary stream of liquid will have its gravity force applied to the liquid at the point of discharge from the speculum under pressure which is thus stabilized.

It is a further object of my invention to provide means for introducing into the aforesaid secondary stream of liquid bubbles of air to be carried with the liquid through the speculum or nozzle into the intestinal tract and subsequently to move with the stream of liquid back through the nozzle for discharge with the liquid into the sewer.

It is a further object of my invention to provide a speculum having therein one channel only and to provide means for causing inlet and outlet of liquid and material carried thereby through said single channel.

The full objects and advantages of my invention will appear in connection with the detailed description thereof and the novel features of the invention by which the above referred to advantageous and useful results are obtained are particularly pointed out in the claims.

In the drawing illustrating an application of my invention in one of its forms:

Fig. 1 is a front elevation showing an embodiment of my improved apparatus compactly mounted on a suitable supporting panel;

Fig. 2 is a vertical section taken through the chamber wherein hot and cold liquids are mixed;

Fig. 3 is a cross section taken along the line 3—3 of Fig. 2; and

Fig. 4 is a detail cross section taken on the line 4—4 of Fig. 1.

In providing for the aforesaid primary stream of tempered liquid, such as water, I connect with a source of water under pressure such as the customary cold water pipe designated C and the customary hot water pipe designated H. Pipe sections 6 and 7 are controlled by valves 6a and 7a and other valves 6b and 7b and the combined stream from the two pipes may be passed through a connector pipe 8 into a mixing chamber 9. These parts, together with other parts hereinafter described, are shown as mounted on a vertical panel P.

The construction of the interior of the mixing chamber 9 is shown in Figs. 2 and 3. An inclined partition or baffle 9a is secured in said chamber a short distance above the bottom thereof and traverses a considerable portion of the cross sectional area of casing 9. It is thus disposed so as to intercept and deflect the streams of hot and cold liquid which are admitted into the casing through the intake conduit 8. This baffle imparts a swirling and churning motion to the incoming stream of liquid and assists in quickly causing the mixture of hot and cold water.

The main stream of water is shown as moving through an upwardly extending pipe 10, to a position at substantially the top of the panel P, then through a connector pipe 11 downwardly extending pipes 12 with an intervening transparent section 12a and to a discharge pipe 13 provided with a customary trap 13a disposed therein.

It will be apparent from this construction that by manipulation of the cocks 6a, 7a and 6b, 7b, a sufficient volume of hot and cold water under pressure may be provided so that it will pass through mixing chamber 9 and provide a continuous stream through the pipe system 10, 11, 12, 12a and 13, to the point of discharge into a sewer or a receptacle leading to a sewer. Preferably the intake pipe 8 is of considerably smaller diameter than the pipe 10, 12 to insure that not too great a volume of water will be passed through the pipe system 10, 12, 13. The short pipe section 11 at the top of the upwardly extending pipe 10 is provided with means for admitting air to prevent a siphon action between pipes 10 and 12 and from the mixing chamber 9 and pipe 10.

As above stated the construction just described is adapted to produce a continuous stream of liquid, such as water, flowing to the maximum height at the point 11 and continuously discharging to the sewer discharge outlet 13. For the purpose of colonic and intestinal irrigation I provide a secondary stream of liquid, such as water, tapped off the primary stream at a point beyond the mixing chamber and which discharges to the sewer discharge outlet, and which has connected therein a nozzle or speculum for introduction into the rectal opening of a subject. As shown, the conduits for this secondary stream comprise a pipe 14 joined with the ascending pipe 10 immediately above the mixing chamber 9. The pipe 14 continues into a branch pipe 15, through a flexible tubing 16, and reversely bent tube 25 which enters the passageway opening through a nozzle N through its side and, as shown, at a reverse angle to the direction of said opening. The end of said nozzle passageway in turn connects with a flexible and collapsible tube 27 including a transparent tube 27a, said last named flexible tube discharging to the sewer disposal pipe 13. A cock 17 controls the volume of flow of this secondary stream of liquid and may be used to cut it off entirely when that is desirable.

From the above it will be apparent that these branch connections will provide for a secondary stream of liquid which may flow continuously from the primary stream to the sewer discharge means and which at the same time may be available to pass through the tubular extension 23 of nozzle N within the intestinal tract when said nozzle is operatively positioned. It will also be apparent that this secondary stream of liquid can be carried into the intestinal tract and withdrawn therefrom through the unobstructed opening through tube 23. Since there will necessarily be back pressure against liquid in tube 23 due to the collapsing tendency of the intestinal tract, when the system of piping for the secondary stream is open said stream will tend to follow the course of least resistance directly through to the sewer discharge. Further this secondary stream following the direct course through to the sewer discharge will tend to draw with it liquid and matter carried thereby from the intestinal tract and this tendency is aided by the rearwardly inclined or reversely bent inlet tube 25. When however it is desired to cause the secondary stream to flow into the intestinal tract in whatever volume may be determined, the flexible tubing 27 is bent or kinked so as to block flow to the sewer discharge with the result that at such times the entire flow of the secondary stream will pass within the intestinal tract. The pressure at which this liquid is delivered is, however, definitely held up to a predetermined maximum which consists of the gravity pressure exerted by a column of liquid extending from the high point 11 in the primary piping system to the point where the nozzle N is positioned for use upon the bench or support T. This support T is adapted to receive the subject and in general will position the rectal opening at a predetermined distance below the maximum elevation of the primary stream. By manipulating the valves 6a, 7a, 6b and 7b a sufficient flow of water is at all times passed through the mixing chamber and the primary and secondary sets of piping so as to cause a continuous primary stream of liquid to flow through the primary set of piping 10, 12 and 13 to discharge to the sewer, and also to supply a continuous secondary stream flowing through the pipes 14, 15, 16, the passageway in nozzle N, pipes 27 and 27a and 13 to the sewer. And this regardless of whether the nozzle discharge 27 has been collapsed to block flow through it and cause the liquid to pass through the nozzle to the rectal cavity or whether it is open so that the secondary stream flows directly when the nozzle is blocked by being in the rectal cavity. There is thus provided regulable means for insuring that the primary stream will be continuously flowing. Furthermore, as clearly shown, the piping for the primary stream is sufficiently large in relation to the passageways for the secondary stream, particularly the passageway through the nozzle N, so that there will be no effective increase in resistance of flow of the primary stream when the discharge tube 27 is collapsed to close it.

It follows that when the colonic pipe 27 is opened up and released that the secondary stream is re-established to flow to the sewer, water and other material from within the intestinal tract, both from pressure therein and from the siphoning effect of the secondary stream, will be withdrawn from the intestinal tract taking with it the substances which it is the purpose of the apparatus to clean therefrom.

In the nozzle structure N the tubular discharge member 23 has an internal diameter of from ⅜ to ¾ inch and has, as shown, a guard or conical plug member 24 attached to the rear portion thereof. Member 23 carries a quick detachable fitting 26 which is adapted to be joined with a cooperating union member secured to the flexible tubing 27. The nozzle at the time of insertion may be provided with the removable obturator A which is shown mounted in an apertured supporting block 29 fixed to panel P. Obturator A has a projecting shank provided with a tapered head 30a of such size as to fit and guard the outer extremity of the nozzle N and at the same time to be capable of being withdrawn through the opening through nozzle N. By removal of the union 26 the obturator may be positioned within the nozzle N and extending to the end of the tubular portion 23, in which position the nozzle may be inserted in the rectal opening and thereafter the obturator A removed and the nozzle member 24 connected with the hose by means of union 26.

For the purpose of admitting a gas such as air into the secondary fluid stream going to nozzle N, I provide an induction tube 21 terminating at its upper end at a level no lower than the highest level of the overflow pipe section 11 which determines the height of the column of liquid in the primary stream thereof. Tube 21 connects with pipe 15, a part of the pipe system for the secondary fluid stream, and a regulating valve 22 permits the tube to be open more or less. The secondary fluid stream will cause air to be injected in at this point which in certain cases has a desirable beneficial result. This injecting effect is aided by providing an annular restriction 15a in pipe 15 as shown in Fig. 4 with a central opening 15b just above the entrance of the opening from valve 22 into pipe 15.

The pipe 15 is shown extending for some distance above the connection 14 and its upper end communicates with the bottom of the tank 18 also mounted on the supporting panel P. Tank 18 is open at its upper end, or, if desired, may be provided with a hinged cover and is adapted to contain medicants in solution. A flow regulating valve 19 in the pipe 15 above its connection with the transverse pipe 14 and valve 17 determines the rate of flow of the medicant from tank 18. A tubular glass gage 20 is shown as mounted at one side of medicant tank 18 and connected at its lower end with the pipe 15 to indicate the medicant level within tank 18.

The advantages of my invention will be apparent from the foregoing description. In practical use, after the nozzle N has been properly positioned, by manipulation of valves 6a and 7a, 6b and 7b, a proper rate of flow of water to cause a continuous primary stream to flow of sufficient volume so that when the secondary stream also is established the primary stream will continue to flow and the pressure stabilization effect of such primary stream moving past the highest point in the piping will be obtained. A proper tempering of that water, as indicated by thermometer 32, is also obtained. The valve 17 will then be opened and liquid—tempered water or with medicant added—will move through the set of piping to establish the secondary stream going from the primary stream to the sewer discharge. The operator manipulating the flexible and collapsible tubing 27 will at the start hold it closed for a considerable period of time to allow a considerable amount of fluid to enter the intestinal tract. When the tubing 27 is released and opened up the flow of the secondary stream will be re-established to the sewer discharge member 13 and the liquid within the intestinal tract will be moved outwardly through the nozzle N and be carried in said secondary stream to the sewer. From time to time the operator will close the pipe 27 and the manner in which it is closed may vary somewhat the pressure of the incoming liquid in the intestinal tract but that pressure can never be more than the stabilized pressure effected by the column of water in height the distance between the position of nozzle N and the highest point of the primary pipe system at 11.

All fluid enters the intestinal tract through the opening in the tubular extension 23 of nozzle N and all liquid, including matter carried thereby, leaves the intestinal tract from the same opening.

I claim:

1. Irrigating apparatus of the class described comprising a system of piping and connections thereto with a source of liquid under variable pressure, said piping constructed and arranged to convey a continuously flowing stream of liquid from said source to an elevated position and thence to a lowered point for sewer discharge, a second set of piping branching from the elevating portion of the first set and constructed and arranged to convey a secondary continuous flowing stream of liquid from said source to said point of discharge, whereby variable pressure of the source will be changed to constant pressure of discharge from said secondary stream at any point thereof, and means for entraining a stream of gaseous bubbles within said continuously flowing secondary stream, whereby a train of said gas is carried with the liquid of said constantly flowing secondary stream.

2. A colonic and intestinal irrigator comprising a mixing chamber, means for delivering thereto hot and cold liquid respectively from sources of supply which delivers the same under pressure, an outlet pipe extending upwardly a considerable distance and then downwardly for conveying a primary stream of tempered liquid therefrom, means connecting said outlet pipe to discharge into a sewer system, a nozzle having a central passageway, a tube connected with the upwardly extending portion of the outlet pipe and with the side of said central passageway, and a second tube connected with said passageway and with the sewer discharge pipe so that when the nozzle is blocked by insertion within a cavity of a human body a secondary stream of tempered liquid will flow through said last named pipes to discharge to the sewer, a subject support located at a fixed distance below the uppermost extent of the outlet pipe for positioning the nozzle when in the rectal cavity of a subject on said support so that when the primary stream is flowing the resulting vertical extent of said primary stream to the nozzle will act as a pressure stabilizer of liquid flowing through the outlet pipe and the nozzle pipe connected therewith, said nozzle discharge pipe embodying means whereby it may be manipulated to cause closure thereof at the will of the operator, whereby flow of liquid under said stabilized pressure will go through the outlet of said nozzle passageway into the body cavity when the same is positioned for irrigation and during the period of closure of said last mentioned pipe and from the body cavity back through the nozzle passageway after said closure is released, the liquid delivering means being regulable to cause said primary stream and said secondary stream both to be continuously flowing while the apparatus is in use, both when the collapsible pipe is closed and when it is open.

3. A colonic intestinal irrigator comprising a mixing chamber, means for delivering thereto hot and cold water respectively from a source of supply which delivers the same under pressure, an outlet pipe extending upwardly a considerable distance and then downwardly for conveying a primary stream of tempered liquid therefrom, means connecting said outlet pipe to discharge into a sewer system, a nozzle having a central passageway, a tube connected with the upwardly extending portion of the outlet pipe and with the side of said central passageway, a collapsible conduit connected with the end of said passageway and with the sewer discharge pipe so when the nozzle is blocked by insertion within a cavity of a human body a secondary stream of tempered liquid will flow through said tube, passageway and conduit to discharge to the sewer, a subject support located at a predetermined distance below the uppermost extent of the outlet pipe for positioning the nozzle when in the rectal cavity of a subject on said support so that when the primary stream is flowing the resulting vertical extent of piping to the nozzle will act as a pressure stabilizer of liquid flowing through the outlet pipe to the nozzle, said collapsible nozzle discharge pipe being adapted to be manipulated to cause closure thereof at the will of the operator, whereby flow of liquid under said stabilized pressure will go through the outlet of said nozzle passageway into the body cavity when the same is positioned for irrigation and during the period of closure of the collapsible pipe and from the body cavity back through said nozzle passageway after said closure is released, the liquid delivery means being regulable to cause said primary stream and said secondary stream both to be continuously flowing while the apparatus is in use both when the collapsible pipe is closed and when it is open.

4. In a colonic and intestinal irrigator a system of piping and connections thereto with a source of liquid under pressure, said piping constructed and arranged to convey a stream of liquid from said source to an elevated position and thence to a lowered point for sewer discharge, a second set of piping branching from the elevating portion of the first set and constructed and arranged to convey a secondary stream of liquid from said source to said point of discharge, a nozzle having a central passageway connected in said second set of piping, a subject support so located in relation to said piping that when the nozzle is positioned in the rectal cavity of a subject on said support the greater part of said elevation of the piping above said discharge will be effective when the primary stream is flowing to cause a predetermined stabilized pressure at the point of discharge from said nozzle, means for regulating the delivery of liquid from said source so as to cause said primary stream to be continuously flowing and said secondary stream to be continuously flowing into the rectal cavity or to discharge when the apparatus is in use, the discharge portion of said second set of piping embodying means whereby it may be manipulated to cause closure and reopening thereof at the will of the operator, the liquid from said secondary stream being caused to pass through the nozzle and into the cavity when the secondary discharge is closed, the liquid and matter carried thereby returning from the cavity through the nozzle to the secondary stream when the discharge piping is opened, and being aided in said movement by said secondary stream to be discharged therewith to the sewer.

5. In a colonic and intestinal irrigator a system of piping and connections thereto with a source of liquid under pressure, said piping constructed and arranged to convey a stream of liquid from said source to an elevated position and thence to a lowered point for sewer discharge, a second set of piping branching from the elevating portion of the first set and constructed and arranged to convey a second stream of liquid from said source to said point of discharge, a nozzle having a central passageway connected in said second set of piping, an inlet connection thereto extending through the side of the nozzle into said central passageway and being reversely bent, a subject support so located in relation to said piping that when the nozzle is positioned in the rectal cavity of a subject on said support the greater part of said elevation of the piping above said discharge will be effective when the primary stream is flowing to cause a predetermined stabilized pressure at the point of discharge from said nozzle, means for regulating the delivery of liquid from said source so as to cause said primary stream to be continuously flowing and said secondary stream to be continuously flowing into the rectal cavity or to discharge when the apparatus is in use, the discharge portion of said second set of piping embodying means whereby it may be manipulated to cause closure and reopening thereof at the will of the operator, the liquid from said secondary stream to be caused to pass through the nozzle and into the cavity when said discharge portion is closed, the liquid and matter carried thereby returning from the cavity through the nozzle to the secondary stream when the discharge portion is opened, and being aided in said movement by said secondary stream to be discharged therewith to the sewer.

6. An irrigator comprising a mixing chamber, an inlet pipe for said chamber adapted to be connected to hot and cold faucets of a city or pressure water system, an outlet pipe rising from the top of the chamber and thence over and downwardly, a connection between the downwardly extending portion of said pipe and a sewage system, a conduit connected to said outlet pipe intermediate said mixing chamber and the upper portion of said pipe, a nozzle having a reversely bent inlet connection with said conduit and having an open outlet, and a pipe adapted to connect said nozzle with said sewage system, said last mentioned pipe embodying means whereby it may be manipulated to cause closure thereof at the will of the operator, whereby the flow of liquid will be directed through the outlet of said nozzle during the obstruction of said last mentioned pipe.

7. An irrigator comprising a tank, an inlet pipe for the tank adapted to be connected to hot and cold faucets of a city or pressure water system, an outlet pipe rising from the top of the tank and provided with a branch which is vented to remove entrapped air from the tank, a second branch connected to said pipe between the first named branch and the tank, a depending pipe connected to the first named branch and constituting a waste pipe, an elbow in the waste pipe adapted to be connected to a sewage system, a jet pipe adapted to be connected to the water system and entering the elbow, a pipe connected to the second named branch pipe, a valve controlling the last named pipe, a tank for supplying a medicinal medium, an outlet for the last named tank, a valve controlling the last named outlet pipe, a common pipe connected to the said last named pipe and to the outlet pipe for the medicinal tank, a flexible hose connected to the common pipe, a nozzle for the hose having a reversely bent inlet connection with the hose, and a pipe adapted to connect the nozzle with the sewage system between said elbow and the trap of the sewage system whereby a suction action is created by the jet pipe in the nozzle outlet pipe.

MILTON IRWIN.